(12) United States Patent
Yoon et al.

(10) Patent No.: US 7,522,919 B2
(45) Date of Patent: Apr. 21, 2009

(54) ENHANCEMENTS TO PERIODIC SILENCES IN WIRELESS COMMUNICATION SYSTEMS

(75) Inventors: Young C. Yoon, San Diego, CA (US); Wanshi Chen, San Diego, CA (US); Hsien Woo, San Diego, CA (US); Anthony C. K. Soong, Superior, CO (US); Srinivasan Balasubramanian, San Diego, CA (US); Thawatt Gopal, San Diego, CA (US); Long Duan, San Diego, CA (US); Shiau-He Shawn Tsai, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 784 days.

(21) Appl. No.: 10/789,587

(22) Filed: Feb. 27, 2004

(65) Prior Publication Data
US 2005/0013283 A1 Jan. 20, 2005

Related U.S. Application Data

(60) Provisional application No. 60/486,934, filed on Jul. 14, 2003.

(51) Int. Cl.
*H04M 3/42* (2006.01)

(52) U.S. Cl. ...................... 455/428; 455/450

(58) Field of Classification Search ............. 455/67.11, 455/226.1, 67.3, 513, 67.4, 226.2, 226.3; 370/77, 95.1, 95.3, 98, 224, 227, 328, 350
See application file for complete search history.

(56) References Cited

U.S. PATENT DOCUMENTS

| 5,606,729 | A | | 2/1997 | Amico et al. | |
|---|---|---|---|---|---|
| 5,987,320 | A | * | 11/1999 | Bobick | ................. 455/423 |
| 6,078,822 | A | * | 6/2000 | Tsujita | ................. 455/552.1 |
| 6,397,070 | B1 | | 5/2002 | Black | |
| 6,952,459 | B2 | * | 10/2005 | Voyer | ................. 375/347 |

FOREIGN PATENT DOCUMENTS

| EP | 0458768 | 11/1991 |
|---|---|---|
| EP | 1168689 | 1/2002 |
| WO | WO99/49689 | 9/1999 |

* cited by examiner

*Primary Examiner*—Sam Bhattacharya
(74) *Attorney, Agent, or Firm*—Coats & Bennett, P.L.L.C.

(57) ABSTRACT

Noise is measured at one or more base stations in a mobile communication system during periodic silence periods. A periodic silence period is defined for at least one carrier that is independent of reverse link channel frame boundaries. The radio base stations transmits silence parameters defining the periodic silence period to mobile stations, which stop transmitting during the periodic silence periods. A time reference is provided to the mobile stations to synchronize the silence periods for all mobile stations.

58 Claims, 7 Drawing Sheets

ENHANCEMENTS TO PERIODIC SILENCES IN WIRELESS COMMUNICATION SYSTEMS

RELATED APPLICATIONS

This application claims priority under 35 U.S.C. § 119(e) from the following provisional application: application Ser. No. 60/486,934 filed on Jul. 14, 2003. That application is incorporated in its entirety by reference herein.

BACKGROUND OF THE INVENTION

The present invention relates generally to adaptive control mechanisms such as rate control and power control for reverse link channels in CDMA networks and, more particularly, to a method of estimating load at a radio base station in a CDMA network.

CDMA networks are interference-limited systems. Since all mobile stations operate at the same frequency, internal interference generated within the network plays a critical role in determining system capacity and signal quality. The transmit power from each mobile station contributes to the reverse link load at the base stations and needs to be controlled to limit interference while maintaining desired performance objectives, e.g., bit error rate (BER), frame error rate (FER), capacity, dropped-call rate, coverage, etc. If the reverse link load becomes too high, widespread outages may occur. An outage is considered to occur when the power required to maintain minimum signal quality standards is greater than the maximum transmit power of the mobile station.

One measure of reverse link load at a radio base station is called Rise Over Thermal (RoT). RoT is generally defined as the ratio between the total received power from all mobile stations at a base station and the thermal noise. RoT is an important measure for reverse link rate control, call admission control and reverse link scheduling for high-speed packet data channels. Accurate measure of RoT has been a long standing problem. While it is relatively easy to measure the sum of the interference and background noise at the base station, it is more difficult to determine the ratio of the two, i.e. RoT, which is the measure of interest. The problem is that the base station almost always has traffic, so there is no opportunity to measure background noise. The present invention relates generally to adaptive control mechanisms such as rate control and power control for reverse link channels in CDMA networks and, more particularly, to a method of estimating load at a radio base station in a CDMA network.

The problem in determining RoT resides in determining the noise power of the background noise (including inter-cell and adjacent carrier interference) in a communication system. Two techniques have been used in the past to determine background noise power. One technique is to estimate the RoT based on estimates of the signal-to-interference-plus-noise ratio (SINR) for signals being demodulated at the base station. This technique, however, yields only a crude estimate of RoT.

A second technique for determining RoT is to silence all mobile stations in the entire network at periodic intervals and measure the noise power during the silence periods. Since no signals are received at the base station from mobile stations during the silence periods, the base station can accurately measure the background noise power. The ratio of the total received power at the base station to the background noise power yields the RoT.

The idea of measuring background noise during periodic silence periods has been proposed for systems where the reverse link frames from all mobile stations are time-aligned and where the data traffic is delay-tolerant. Systems where periodic silence periods have been proposed include IS-856 and 1xEV-DO systems. Because reverse link frames on these systems are synchronous, it is a relatively easy task to silence all mobile stations for a single frame. Also, because the systems were entirely new, the systems do not have to maintain compatibility with legacy mobile stations. Another problem with prior art solutions is that no provision has been made to account for adjacent carrier interference in multi-carrier systems.

SUMMARY OF THE INVENTION

The present invention relates to a method and apparatus for measuring noise in a mobile communication system where the mobile stations do not transmit synchronously on all reverse link channels. According to the various embodiments of the present invention, transmitters from all mobile stations on all reverse link channels are periodically silenced while the base stations measure the noise. The measured noise may include inter-cell and adjacent carrier interference. The measured noise may be used in determining the reverse link load at the base stations.

In one embodiment of the invention, a periodic silence period is defined that is independent of frame boundaries on the reverse link channels. An absolute time reference is provided for synchronizing the silence period for all mobile stations transmitting on reverse link channels.

In a second embodiment of the invention, non-synchronous and overlapping silence periods are defined for reverse link channels with different frame timing. In this embodiment, the silence periods preferably coincide with frame boundaries and encompass two or more frames. The RBS measures the background noise during the time when the silence periods overlap.

DETAILED DESCRIPTION OF THE INVENTION

Figure 1:
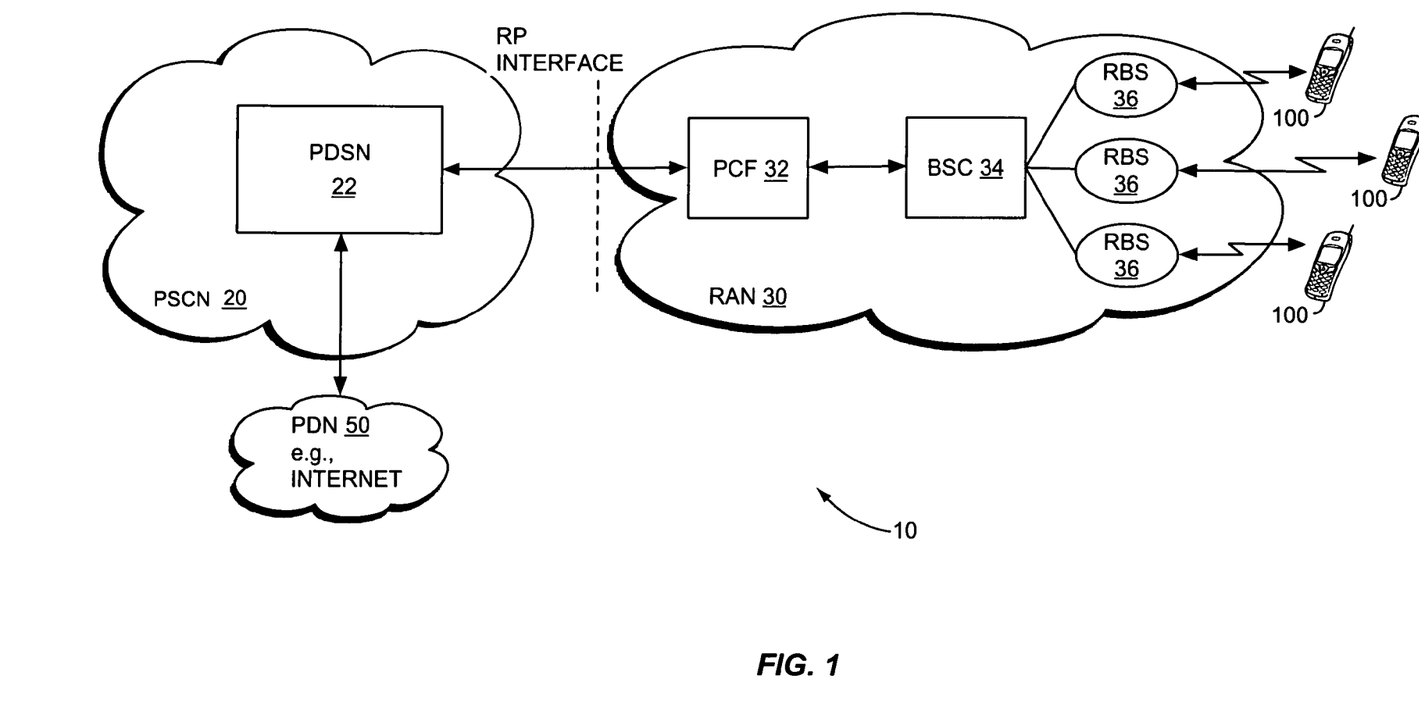
FIG. 1 is a block diagram of a wireless communication network.

Turning to the drawings, FIG. 1 illustrates an exemplary wireless communication network 10 in which the present invention may be implemented. Network 10 may be any packet-switched communication network, for example, a cdma2000 wireless network according to the IS-2000/2001 families of standards. However, those skilled in the art will appreciate that the wireless communication network may be configured according to other standards, such as Wideband CDMA (WCDMA) and the Universal Mobile Telecommunications System (UMTS) standard.

Network 10 includes a Packet-Switched Core Network (PSCN) 20 and a Radio Access Network (RAN) 30. The PSCN 20 includes a packet data serving node (PDSN) that provides connection to one or more Public Data Networks (PDNs) 50, such as the Internet. The details of the PSCN 20 are not material to the present invention and, therefore, the PSCN 20 is not discussed further herein.

The RAN 30 provides the radio interface between the mobile stations 100 and the PCSN 20. An exemplary RAN 30 comprises a Packet Control Function (PCF) 32, one or more Base Station Controllers (BSC) 34, and a plurality of Radio Base Stations (RBSS) 36. BSCs 34 connect the RBSs 36 to the PCF 32 and manage the communication resources for the RBS 36. Mobile stations 100 communicate with the RBSs 36 via the air interface as defined by the appropriate network standards, such as the IS-2000 family of standards.

Figure 2:
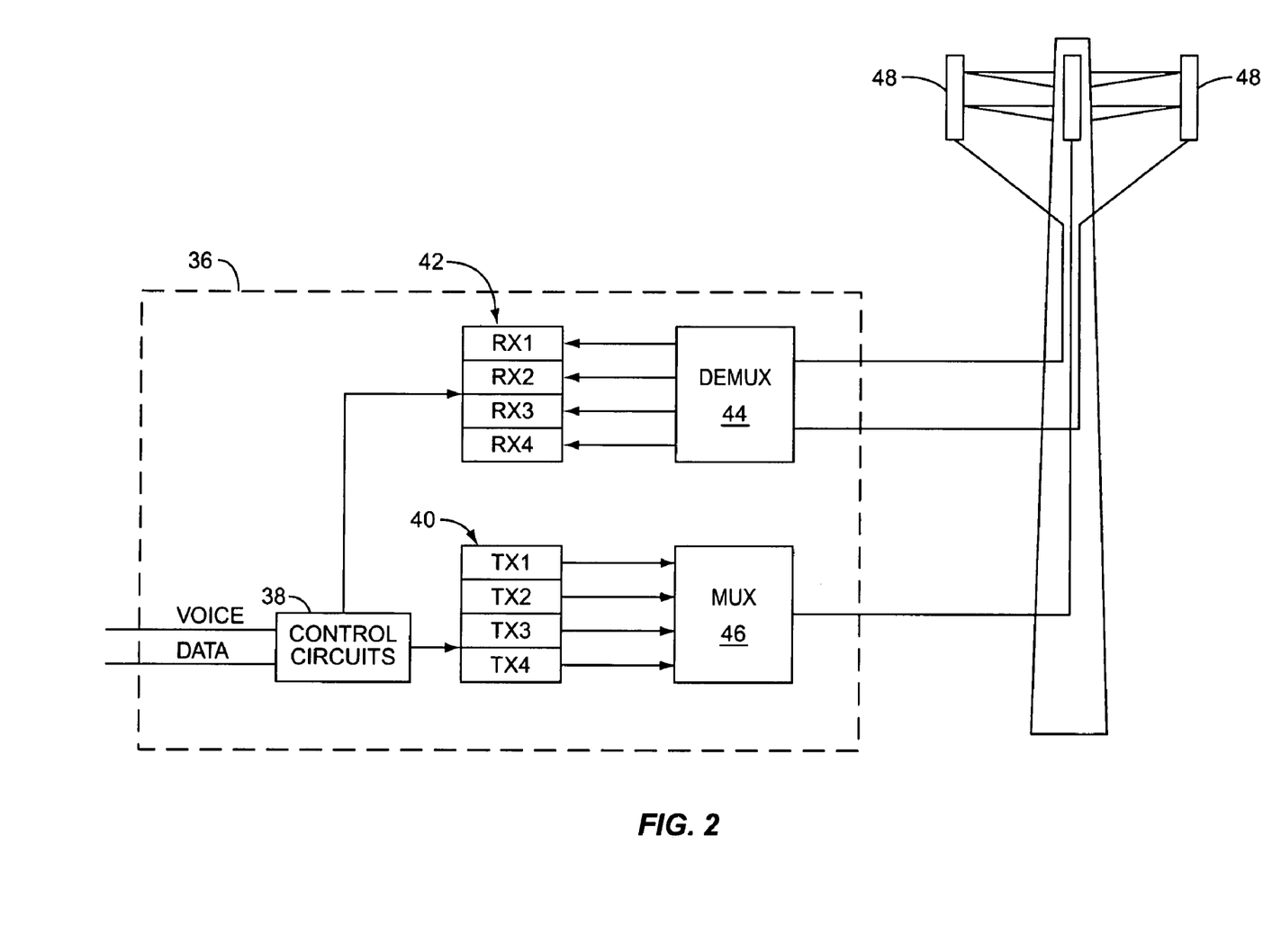
FIG. 2 is a block diagram of a radio base station in the wireless communication network of FIG. 1.

FIG. 2 illustrates a functional diagram of an exemplary RBS 36 according to one embodiment of the present invention. The RBS 36 includes control circuits 38, a plurality of transmitters 40 and receivers 42, a multiplexer 44, a demultiplexer 46 and one or more transmit and receive antennas 48. The control circuits 38 control the operation of the RBS 36. Control circuits 38 may comprise one or more microprocessors or microcontrollers, or other logic circuits. Signals received by receive antennas 48 from mobile stations 100 are demultiplexed by demultiplexer 46 and fed to the receivers 42 for processing. Signals transmitted by the RBS 36 are combined by the multiplexer 30 and applied to transmit antennas 48. The functional elements of FIG. 2 may be implemented in software, hardware, or some combination of both. For example, one or more of the functional elements in RBS 36 may be implemented as stored program instructions executed by one or more microprocessors or other logic circuits included in RBS 36.

Figure 3:
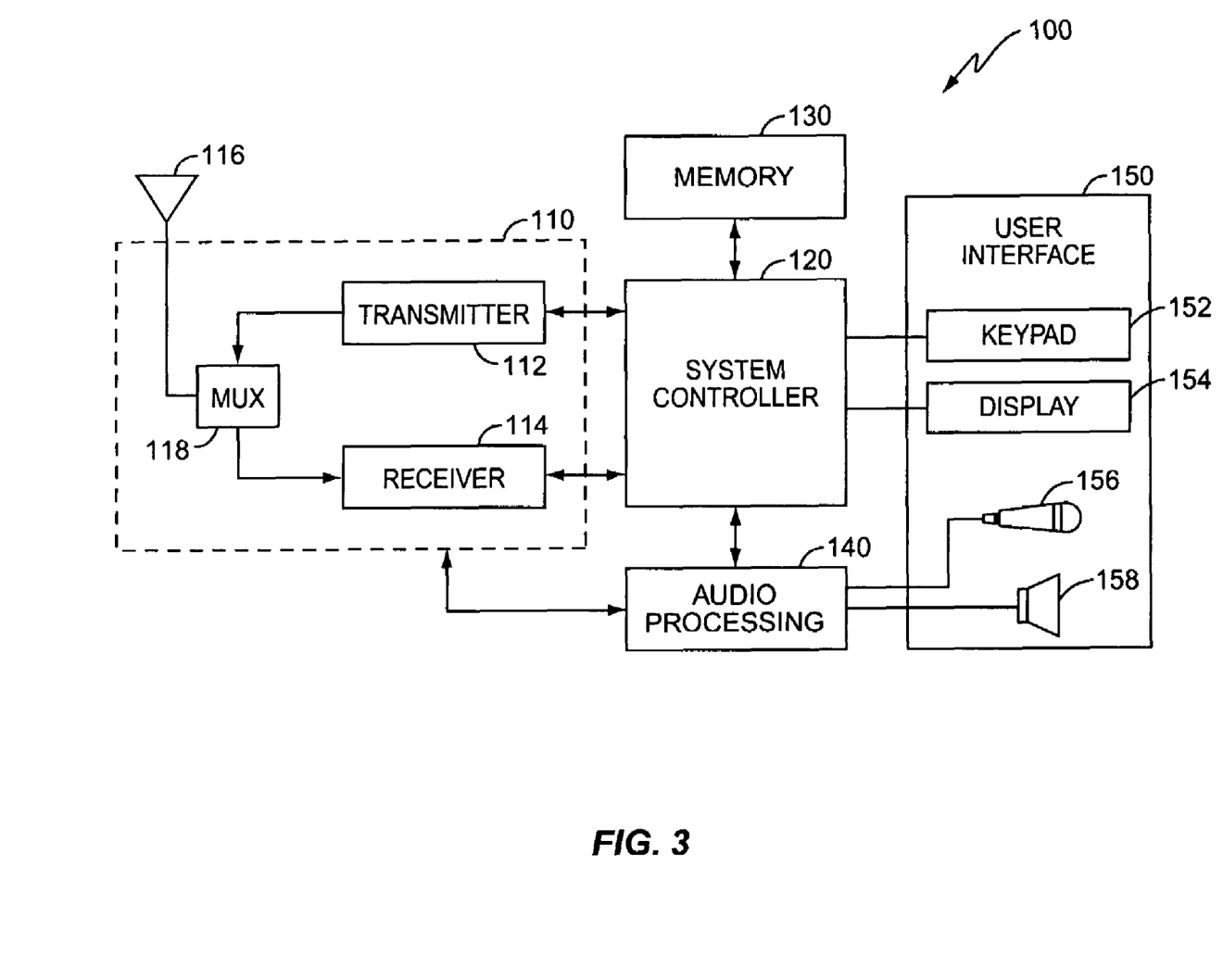
FIG. 3 is a block diagram of a mobile station in the wireless communication network of FIG. 1.

FIG. 3 is a functional block diagram of an exemplary mobile station 100 according to one embodiment of the present invention. As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

Mobile station 100 includes a transceiver 110 connected to an antenna 116 via a multiplexer 118 as known in the art. Mobile station 100 further includes a system controller 120, memory 130, an audio processing circuit 140, and a user interface 150. Transceiver 110 includes a transmitter 112 and a receiver 114. Transceiver 110 may for example operate according to the cdma2000 or WCDMA standards. The present invention, however, is not limited to use with these standards and those skilled in the art will recognize the present invention may be extended or modified for other standards.

System controller 120 provides overall operational control for the mobile station 100 according to programs instructions stored in memory 130. System controller 120 may comprise a microprocessor or microcontroller and may be part of an application specific integrated circuit (ASIC). Memory 130 represents the entire hierarchy of memory in a mobile station 100. Memory 130 provides storage for data, operating system programs and application programs. Memory 130 may be integrated with the system controller, or may be implemented in one or more discrete memory devices. Audio processing circuit 140 processes audio signals transmitted and received by mobile station 100.

User interface 150 typically comprises a keypad 152, display 154, microphone 156 and/or speaker 158. Keypad 152 allows he operator to enter commands and select menu options while display 154 allows the operator to see menu options, entered commands, and other service information. Microphone 156 converts the operator's speech into electrical audio signals for input to audio processing circuits 140. Speaker 158 converts audio signals output from the audio processing circuits 140 into audible signals that can be heard by the operator.

The RBS 36 communicates with a plurality of mobile stations 100. The RBS 36 receives signals from the mobile stations 100 over a number of reverse link channels. The reverse link channels in a cdma2000 network, for example, may include a reverse pilot channel (R-PICH), a reverse secondary pilot channel (R-SPICH), a reverse dedicated control channel (R-DCCH), a reverse fundamental channel (R-FCH), a reverse supplemental channel (R-SCH), a reverse power control channel (R-PCCH), a reverse ACK channel (R-ACKCH), a reverse channel quality indicator channel (R-CQICH), a reverse packet data channel (R-PDCH), a reverse request channel (R-REQCH), and a reverse packet data control channel (R-PDCCH), a Reverse Access Channel (R-ACH), the Reverse Enhanced Access Channel (R-EACH), and the Reverse Common signaling Channel (R-CSCH). The mobile station 100 transmits pilot signals on the R-PICH and R-SPICH, which are used by the RBS 36 for channel estimation and signal strength measurement. The R-FCH and R-SCH are traffic channels used to carry voice and/or data. The R-DCCH carries signaling overhead for the R-FCH and R-SCH. The R-PDCH is a high speed packet data channel for reverse link traffic. The R-PDCCH carries signaling overhead for the R-PDCH. The R-REQCH carries resource request information in support of the R-PDCH. The R-ACKCH is used by the mobile station 100 to acknowledge data frames transmitted to the mobile station 100 on the forward link. The R-PCCH is used by the mobile station 100 to send power control information to the base station. The R-ACH and R-EACH are used to transmit access probes for random accesses. The R-CSCH is a common signaling channel. The listing of reverse link channels is not exhaustive and other reverse link channels may also be present. Also, the listed channels are not required for practicing the present invention. In preferred embodiments of the invention, transmissions on all reverse link channels should be silenced to allow measurement of background noise.

In some CDMA systems, the frame timing is not the same for all reverse link channels. Further, the frame timing may be different on some reverse link channels for different mobile stations. Because not all of the reverse link channels are synchronous, it is not possible to designate a single frame as a "silence period" so that the RBS 36 can measure the noise power of the background noise in the communication system.

According to the present invention, a periodic silence period is defined that will be the same for all mobile stations, even though the frame timing is not synchronous across all reverse link channels, and even though the frame timing is not the same between all mobile stations 100. According to the present invention, silence parameters are transmitted by the RBS 36 to the mobile stations 100. The silence parameters specify the frequency or periodicity, duration, and time reference for a periodic silence period. The value of the silence parameters may be chosen by the system operators and programmed into the RBS 36 when the RBS 36 is configured.

The periodicity parameter specifies the frequency of the silence period. A typical value for period density may be ten seconds. The duration parameter specifies the length of the silence period. A typical value for the duration parameter may be 20 ms. In a preferred embodiment, the time reference parameter provides an absolute time reference for synchronizing the silence periods for all mobile stations and all reverse link channels. The time reference may be derived from or based on the system clock or a Global Positioning System (GPS) clock. The time reference may, for example, designate the start time for the next silence period. The silence parameters are preferably broadcast as part of a control message over the forward broadcast control channel (F-BCCH). Alternatively, the silence parameters may be sent to the mobile stations 100 over the Forward Paging Channel (F-PCH). For backward compatibility with existing mobile stations 100, it may be necessary to transmit the silence parameters on both the F-PCH and F-BCCH.

Figure 4:
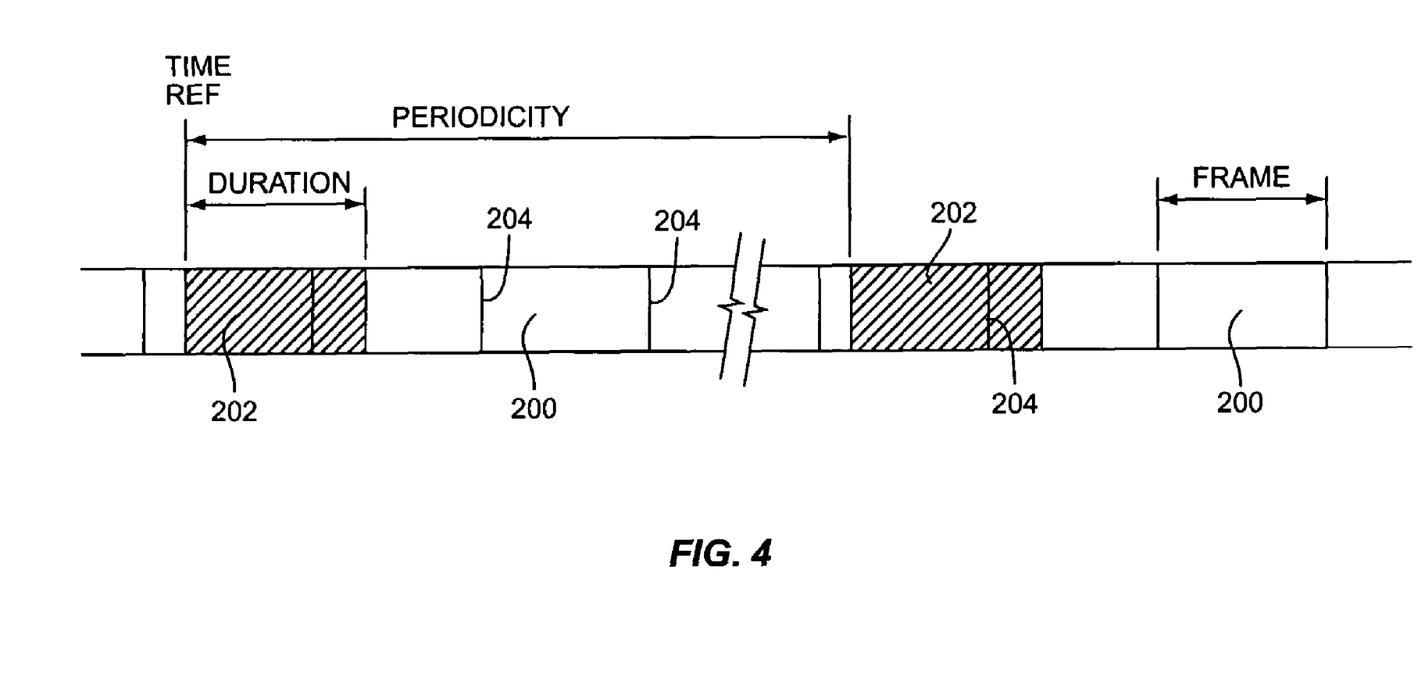
FIG. 4 illustrates a periodic silence period on a revere link channel.

FIG. 4 illustrates frame timing and silence periods for an exemplary reverse link channel. As shown in FIG. 4, each reverse link channel is divided into a plurality of frames 200. In this example, it is assumed that the frames 200 for all of the reverse link channels are 20 ms in duration. It is not required, however, that the frames for all channels be the same length. Each frame is further divided into power control groups (PCGs) 206. In the exemplary embodiment, there are 16 PCGs in each frame 200. The periodicity and duration parameters may be specified in terms of PCGs.

The shaded regions in FIG. 4 represent silence periods 202, which in this example are 16 PCGs or 20 ms in duration. It is not necessary, however, that the silence periods be the same length as the reverse link frame. As shown in FIG. 4, the silence periods 202 do not necessarily coincide with the frame boundaries. Also, it should be noted that the silence periods 202 may cross frame boundaries 204 and encompass parts of two separate frames 200. The time reference links the beginning of each silence period to an absolute time reference, such as a system clock or GPS clock so that the silence periods can be synchronized for all mobile stations 100 and all reverse link channels.

The mobile stations 100 are programmed to read the F-BCCH and/or F-PCH to obtain the silence parameters. During operation, the mobile stations 100 suspend transmissions on all reverse link channels during the designated silence periods 202 while the RBS 36 measures the power of the background noise. At the end of each silence period 202, the mobile stations 100 resume transmissions on the reverse link channels. On reverse link channels that carry delay tolerant traffic, the mobile station 100 may stop and restart transmissions in the middle of a frame 200 so that no frames are missed. For real time traffic channels that are not tolerant of delays, such as voice channels, the mobile station 100 may erase the frames 200 that would have been transmitted during the silence period 202. If the silence period 202 begins in the middle of a frame 200, the mobile station 100 may erase all frames 200 that overlap with the silence period. The mobile station 100 would then resume transmitting at the start of the first full frame 200 after the end of a silence period 202. Alternatively the mobile station 100 may transmit the first part of the frame that overlaps the beginning of the silence period, suspend transmission during the silence period, and then transmit the remainder of the frame following the silence period. In this case, the frame overlapping the end of the silence period and all intervening frames would be erased. This method preserves at least one frame of data that would otherwise have been erased.

For some channels, the mobile station 100 may check prior to transmitting a frame whether the frame to be transmitted overlaps with a silence period. Channels on which this procedure may be used include the Reverse Access Channel (R-ACH), the Reverse Enhanced Access Channel (R-EACH), and the Reverse Common signaling Channel (R-CSCH). Prior to transmitting an access probe on the R-ACH or R-EACH, the mobile station 100 may be required to check whether the access probe transmission overlaps a silence period. If so, the mobile station 100 may be required to delay the access probe transmission to the next R-ACH or R-EACH slot that does not overlap with the silence period. A similar procedure may be used on the R-CSCH.

Similar procedures to those described above may be employed on the forward channels. In cases where the silence period starts in the middle of the frame, the mobile station 100 may store the first part of the frame before the interruption in memory. When the silence period ends, the RBS 36 may transmit the remainder of the frame 200. The mobile station 100 may combine the two parts to form the complete frame. Frames that are completely blanked by the silence period may be erased. In some cases, the RBS 36 may erase all frames that overlap the silence period.

In some mobile communication systems, it may not be desirable for all mobile stations 100 to suddenly stop and start transmitting. According to one embodiment of the invention, the mobile stations 100 are programmed to gradually decrease their transmit power from a current transmit level to zero at the start of a silence period 202, and to gradually increase transmit power from zero to a desired transmit power level at the end of the silence period 202. This gradual ramping-down and ramping-up of the mobile station transmit power at the beginning and end respectively of the silence period 202 is illustrated in FIGS. 5A and 5B.

Figure 5A:
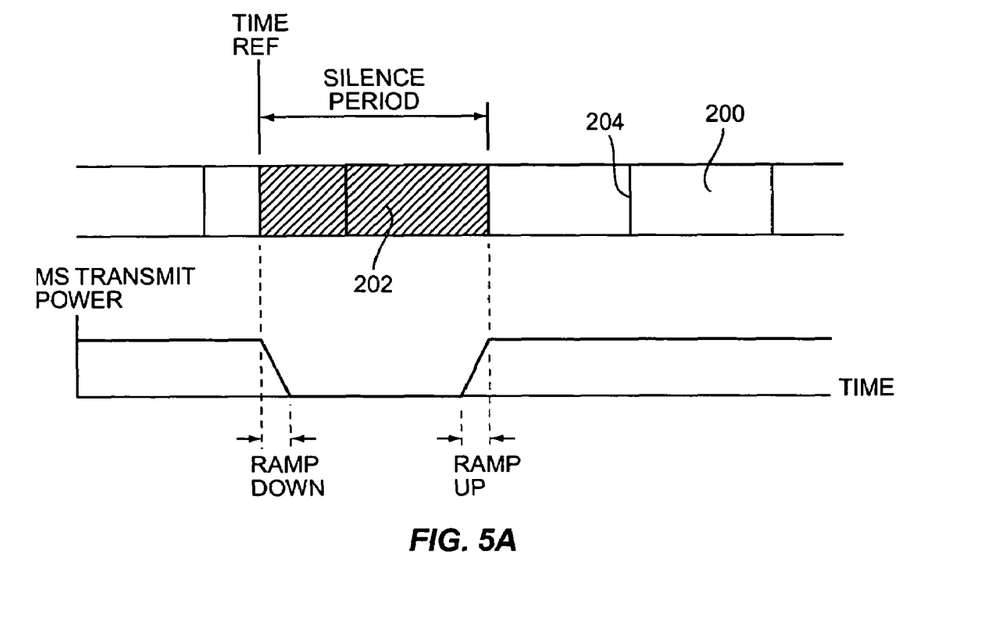
FIGS. 5A and 5B illustrate ramping mobile station transmit power at the beginning and end of a silence period.
Figure 5B:
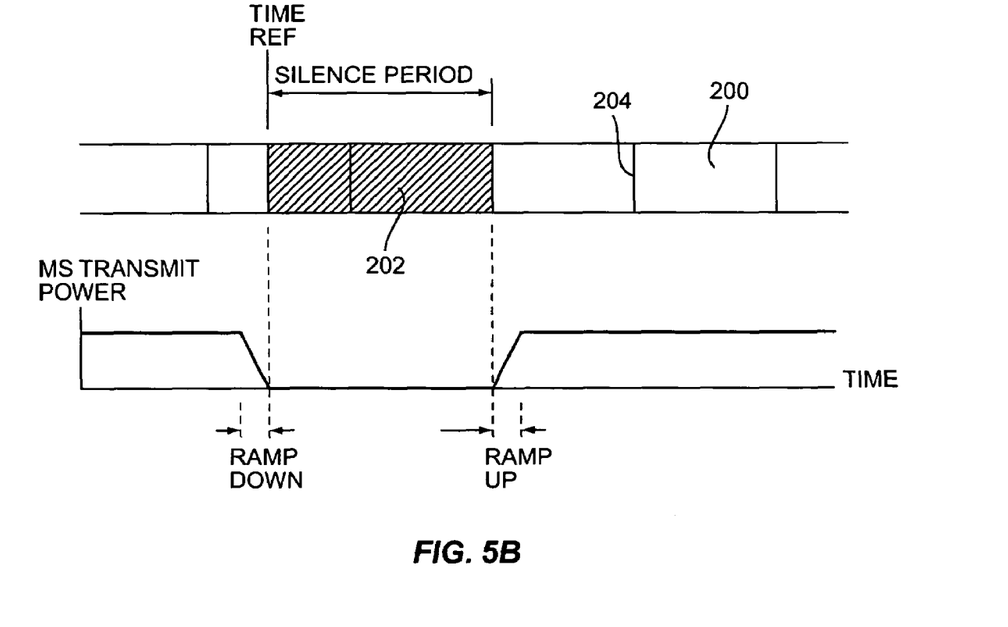

In FIG. 5A, the silence period includes a guard time for ramping power up and down and the beginning and end respectively of the silence period. In this case, the time reference parameter marks the time at which the mobile station 100 begins ramping down its transmit power. In FIG. 5B, the mobile stations 100 began ramping-down their transmit power before the start of the silence period 202, and began ramping-up just after the end of the silence period 202. In this case, the time reference parameter identifies the time when all transmissions must be silenced. In either case, the RBS 36 may transmit a fourth silence parameter that specifies how quickly the mobile station 100 must ramp-down and ramp-up its transmit power. The RBS 36 may specify either a fixed time period for ramping-up and ramping-down the transmit power or, alternatively, may specify a rate for ramping-down and ramping-up the transmit power. The ramp rate could also be specified by applicable standards.

Figure 6:
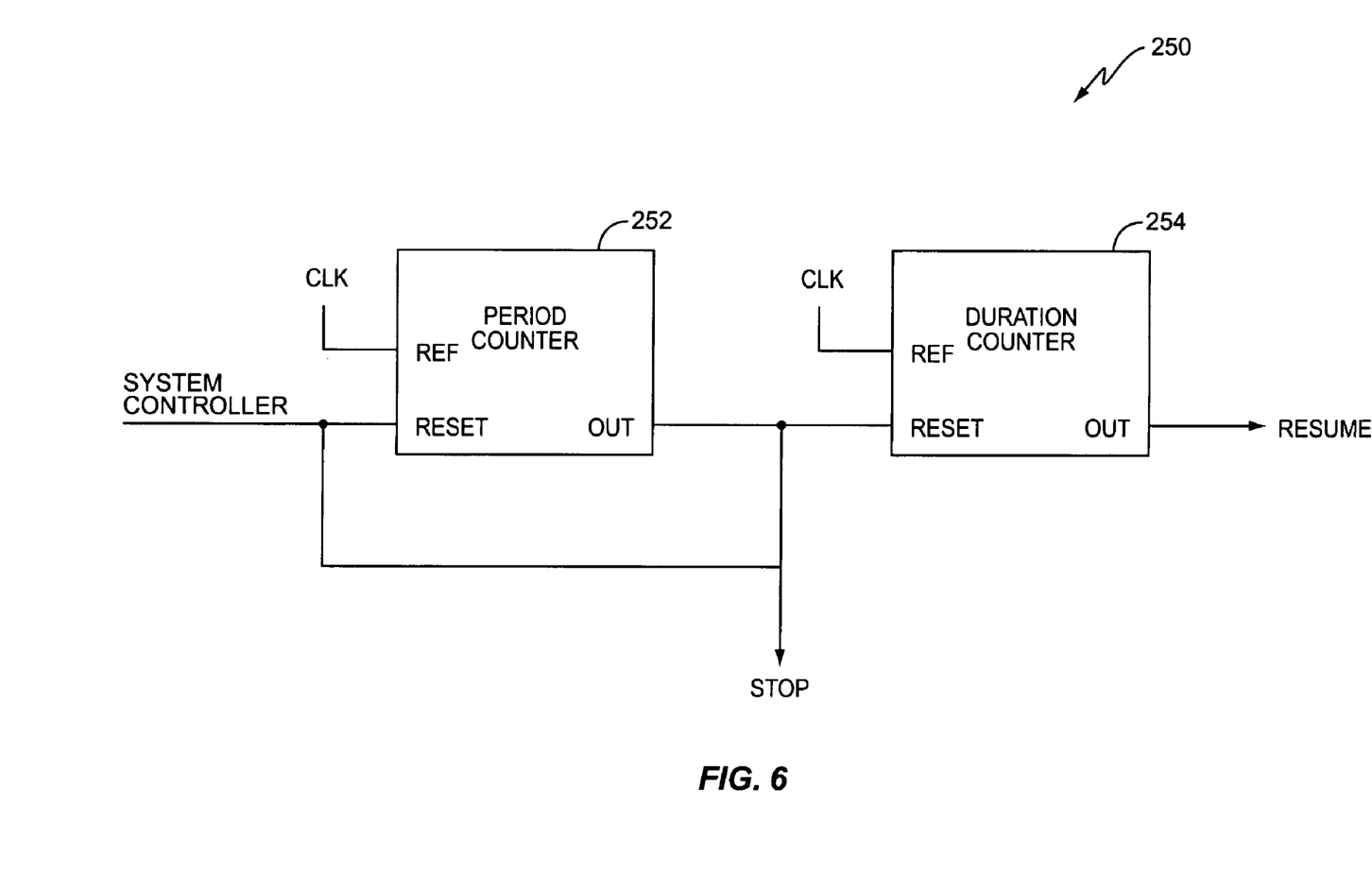
FIG. 6 illustrates a clock circuit used in a mobile station to implement periodic silent periods.

FIG. 6 illustrates a clock circuit 250 for implementing periodic silence periods in a mobile station 100. The clock circuit 250 comprises a pair of counters 252, 254 that function as count-down timers. In the exemplary embodiment of the invention, the periodicity and duration parameters are specified in terms of PCGs, and the counters 252, 254 count the number power control groups (PCGs). Both counters 252, 254 receive a 800 Hz clock signal as a reference. The system controller 120 sets the starting values of the counters 252, 254 based on the silence parameters. The periodicity parameter determines the initial value of the period counter 252. The duration parameter determines the initial value of the duration counter 254. The period counter 252 generates a stop signal that marks the beginning of each silence period 202. The stop signal from the period counter 252 resets the duration counter 254. When the duration counter 254 counts down to zero, the duration counter 254 generates a resume signal. The system controller 120 stops transmissions on the reverse link channels responsive to the stop signal and resumes transmissions on the reverse link channel responsive to the resume signal.

When the mobile station 100 is first turned on, the system controller 120 uses the time reference parameter read from the broadcast channel to start the period counter 252 for the first silence period 202. Thereafter, the period counter 252 resets itself each time it generates a stop signal. The system controller 120 may also reset the period counter 252 to compensate for clock drift.

Not all mobile stations 100 in use will recognize silence periods 202. There are several ways to address the problem of legacy mobile stations 100. In a multi-carrier system, the legacy mobile stations 100 that do not recognize silence periods could be assigned to one carrier and mobile stations 100 recognizing silence periods could be assigned to a separate carrier. In this case, a small fraction of the noise power measured may be attributable to adjacent carrier interference. In most systems, the amount of adjacent carrier interference should be sufficiently small to yield a reliable measure of background noise power. In a single carrier system, the legacy mobile stations 100 may be commanded to perform a candidate frequency search on another frequency, which may be a dummy carrier that is not currently in use, during the silence periods.

In some embodiments, implementation of the silence periods may detrimentally affect reverse link power control. Because there is no reverse link signal during the silence period, the RBS 36 is unable to measure the signal to noise ratio (SNR) on the reverse link or otherwise determine variations in reverse link channel conditions, which is needed to generate power control commands for inner loop power control. Therefore, it may be desirable to turn off the forward link power control subchannel and/or instruct the mobile station 100 to disregard the forward link power control channel. Since reverse link power control is not performed during the silence period, it may also be desirable to adjust the target set point used by the RBS 36 at the end of the silence period. For example, if the target set point is Eb/Nt=5 dB at the start of the silence period, the set point may be adjusted to Eb/Nt=5.5 when moving out of the silence period to provide greater cushion in the event that transmit conditions have worsened during the silence period and more power is needed.

Figure 7:
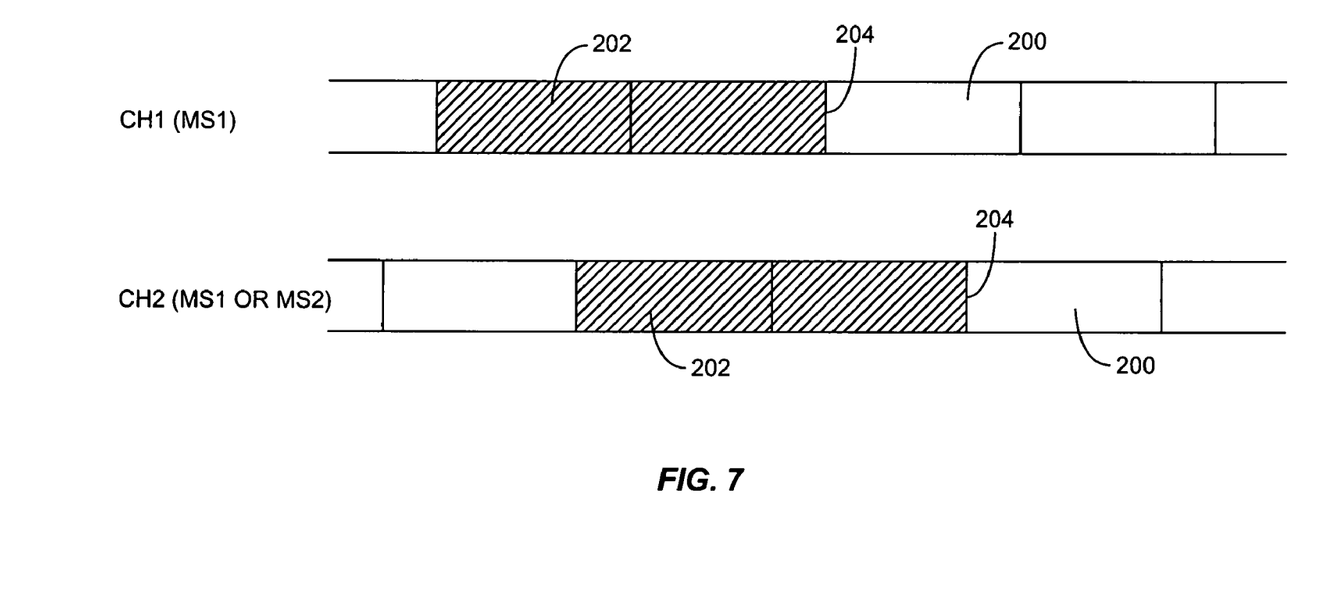
FIG. 7 illustrates non-synchronous and overlapping silence periods for two non-synchronous reverse link channels.

FIG. 7 illustrates an alternate embodiment of the invention. FIG. 7 shows two reverse link channels, labeled CH1 and CH2, with different frame timing. The frame length on each channel is the same, but may be different in some embodiments of the invention. Channels CH1 and CH2 may be used by a single mobile station, or may be used by two different mobile stations. Non-synchronous and overlapping silence periods 202 are defined for channels CH1 and CH2. In the exemplary embodiment, the length of the silence periods 202 is equal to two or more frames, and the beginning and end of the silence periods 202 coincide with frame boundaries 204. Thus, the duration of the silence period 202 is equal to an integer multiple of the frame length. In this embodiment, the RBSs 36 measure the background noise in the time when the silence periods 202 overlap. In systems where the frame length is the same for all reverse link channels, an effective silence period equal in length to one frame can be obtained by silencing all mobile stations 100 for two consecutive frames. One advantage of this embodiment is that the mobile stations 100 start and stop transmitting at different times so the RBS 36 does not see drastic step changes in load.

The present invention may, of course be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of measuring noise at one or more base stations in a mobile communication system, comprising:
   defining a periodic silence period for at least one carrier that is independent of reverse link channel frame boundaries;
   transmitting silence parameters that define the periodic silence period to mobile stations communicating with the base stations, wherein the mobile stations stop transmitting during the periodic silence period; and
   measuring the noise at each base station during the periodic silence periods.

2. The method of claim 1 wherein the silence parameters include a frequency parameter that indicates the frequency of the silence period, a duration parameter that indicates the duration of the silence period, and a time reference parameter that provides an absolute time reference for synchronizing silence periods for non-synchronous reverse link channels.

3. The method of claim 1 wherein the periodic silence period encompasses portions of at least two consecutive reverse link frames.

4. The method of claim 1 wherein measuring the noise at each base station during the periodic silence periods comprises measuring the power of the noise during the periodic silence period.

5. The method of claim 1 wherein the noise includes adjacent carrier interference.

6. The method of claim 1 wherein the mobile communication system is a multi-carrier system and wherein the periodic silence period is defined for at least one carrier.

7. The method of claim 6 further comprising:
   assigning a first group of mobile stations to a first carrier with a periodic silence period; and
   assigning a second group of mobile stations to a second carrier without a periodic silence period.

8. The method of claim 6 wherein the periodic silence period is defined for a plurality of carriers.

9. The method of claim 8 wherein the periodic silence period is synchronized for two or more carriers.

10. The method of claim 6 wherein the periodic silence period is defined for all carriers.

11. The method of claim 10 wherein the periodic silence period is synchronized for all carriers.

12. The method of claim 1 further comprising causing legacy mobile stations that do not recognize silence periods to stop transmitting on the reverse link during a silence period.

13. The method of claim 12 wherein causing legacy mobile stations that do not recognize silence periods to stop transmitting on the reverse link during a silence period comprises directing the legacy mobile stations to a dummy carrier during the silence period.

14. The method of claim 12 wherein causing legacy mobile stations that do not recognize silence periods to stop transmitting on the reverse link during a silence period comprises directing the legacy mobile stations to perform a candidate frequency search on a different carrier during the silence period.

15. The method of claim 1 wherein the duration of the silence period is at least one frame.

16. The method of claim 1 wherein the duration of the silence period is less than one frame.

17. The method of claim 1 further comprising suspending transmission of power control commands on a forward link power control channel during the silence period.

18. The method of claim 1 wherein the base stations adjust a power control set point for outer loop power control during the silence period.

19. A base station in a mobile communication system comprising:
   a controller to define a periodic silence period for at least one carrier that is independent of reverse link channel frame boundaries
   a transmitter to transmit silence parameters that define the periodic silence period to mobile stations; and
   a receiver including a measurement circuit to measure noise during the periodic silence period.

20. The base station of claim 19 wherein the silence parameters include a frequency parameter that indicates the frequency of the silence period, a duration parameter that indicates the duration of the silence period, and a time reference parameter that provides an absolute time reference for synchronizing silence periods for non-synchronous reverse link channels.

21. The base station of claim 19 wherein the periodic silence period encompasses portions of at least two consecutive frames.

22. The base station of claim 19 wherein the receiver measures the power of the noise during the periodic silence period.

23. The base station of claim 19 wherein the noise includes adjacent carrier interference.

24. The base station of claim 19 wherein the mobile communication system is a multi-carrier system and wherein the controller defines a periodic silence period for at least one carrier.

25. The base station of claim 24 wherein the controller is further operative to:
   assigning a first group of mobile stations to a first carrier with a periodic silence period; and
   assigning a second group of mobile stations to a second carrier without a periodic silence period.

26. The base station of claim 24 wherein the periodic silence period is defined for a plurality of carriers.

27. The base station of claim 26 wherein the periodic silence period is synchronized for two or more carriers.

28. The base station of claim 24 wherein the periodic silence period is defined for all carriers.

29. The base station of claim 19 wherein the periodic silence period is synchronized for all carriers.

30. The base station of claim 19 further wherein the controller is operative to cause legacy mobile stations that do not recognize silence periods to stop transmitting on the reverse link during a silence period.

31. The base station of claim 30 wherein the controller directs the legacy mobile stations to a dummy carrier during the silence period.

32. The base station of claim 30 wherein the controller instructs the legacy mobile stations to perform a candidate frequency search on a different carrier during the silence period.

33. The base station of claim 19 wherein the duration of the silence period is at least one frame.

34. The base station of claim 19 wherein the duration of the silence period is less than one frame.

35. The base station of claim 19 wherein the controller suspends transmission of power control commands on a forward link power control channel during the silence period.

36. The base station of claim 19 wherein the controller is operative to adjust a power control set for outer loop power control during the silence period.

37. A mobile station in a mobile communication network comprising:
   a transmitter to transmit signals to one or more base stations on one or more revere link channels;
   a receiver to receive from a base station silence parameters that define a periodic silence period that is independent of reverse link channel frame boundaries; and
   a controller operatively connected to the transmitter and the receiver, said controller operative to shut off the transmitter during the periodic silence period.

38. The mobile station of claim 37 wherein the controller is further operative to gradually transmit power at the beginning of the periodic silence period, and to gradually increase transmit power at the end of the silence period.

39. The mobile station of claim 37 wherein the silence parameters include a frequency parameter that indicates the frequency of the silence period, a duration parameter that indicates the duration of the silence period, and a time reference parameter that provides an absolute time reference for synchronizing silence periods for non-synchronous reverse link channels.

40. The mobile station of claim 37 wherein the periodic silence periods encompass portions of at least two consecutive frames.

41. The mobile station of claim 37 wherein the controller is programmed to ignore a forward power control channel during the silence period.

42. The mobile station of claim 37 wherein the duration of the silence period is at least one frame.

43. The mobile station of claim 37 wherein the duration of the silence period is less than one frame.

44. A method of measuring noise at one or more base stations in a mobile communication system, comprising:
   defining non-synchronous and overlapping silence periods for at least two reverse link channels with different frame timing;
   transmitting silence parameters that define the periodic silence periods to the mobile stations, wherein the mobile stations stop transmitting on the reverse link channels during the periodic silence periods; and
   measuring the noise at each base station during the overlap in the periodic silence periods.

45. The method of claim 44 wherein the periodic silence periods encompass portions of at least two consecutive reverse link frames.

46. The method of claim 44 wherein measuring the noise at each base station during the periodic silence periods comprises measuring the power of the noise during the periodic silence period.

47. The method of claim 44 wherein the noise includes adjacent carrier interference.

48. The method of claim 44 wherein the mobile communication system is a multi-carrier system and wherein the periodic silence periods are defined for all reverse link channels on at least one carrier.

49. The method of claim 44 wherein the duration of the silence period is at least one frame.

50. The method of claim 44 wherein the duration of the silence period is less than one frame.

51. A transmission method to facilitate measurement of background noise in a mobile communication system, comprising:
   defining a periodic silence period for at least one carrier that is independent of reverse link channel frame boundaries;
   determining whether a frame overlaps a silence period;

controlling a transmitter responsive to the determination whether a frame overlaps a silence period.

52. The method of claim 51 wherein controlling a transmitter responsive to the determination whether a frame overlaps a silence period comprises transmitting a first part of the frame; suspending transmission of the frame during the silence period, and transmitting a second part of the frame following the silence period.

53. The method of claim 51 wherein controlling a transmitter responsive to the determination whether a frame overlaps a silence period comprises delaying transmission of a frame if the frame overlaps a silence period, and transmitting the delayed frame following the silence period.

54. The method of claim 51 wherein controlling a transmitter responsive to the determination whether a frame overlaps a silence period comprises erasing a frame if the frame overlaps a silence period.

55. A communication apparatus for a wireless communication network comprising:

a transmitter to transmit signals on a channel that is divided into a plurality of frames; and a controller operatively connected to the transmitter, said controller operative to:

determine whether a frame overlaps a silence period, wherein the silence period is independent of frame boundaries; and to control the transmitter responsive to the determination whether a frame overlaps the silence period.

56. The communication apparatus of claim 55 wherein the controller causes the transmitter to:

transmit a first part of the frame;

suspend transmission of the frame during the silence period; and resume transmission and transmit a second part of the frame following the silence period.

57. The communication apparatus of claim 56 wherein the controller causes the transmitter to delay transmission of a frame that overlaps with the silence period, and to transmit the delayed frame following the silence period.

58. The communication apparatus of claim 56 wherein the controller erases a frame that overlaps with the silence period.

* * * * *

UNITED STATES PATENT AND TRADEMARK OFFICE
CERTIFICATE OF CORRECTION

PATENT NO. : 7,522,919 B2  Page 1 of 1
APPLICATION NO. : 10/789587
DATED : April 21, 2009
INVENTOR(S) : Yoon et al.

It is certified that error appears in the above-identified patent and that said Letters Patent is hereby corrected as shown below:

In Column 3, Line 10, delete "(RBSS)" and insert -- (RBSs) --, therefor.

In Column 9, Line 8, in Claim 19, delete "boundaries" and insert -- boundaries; --, therefor.

In Column 9, Line 47, in Claim 30, delete "further wherein" and insert -- wherein --, therefor.

In Column 9, Line 66, in Claim 36, after "set" insert -- point --.

In Column 10, Line 4, in Claim 37, delete "revere" and insert -- reverse --, therefor.

Signed and Sealed this

Tenth Day of November, 2009

David J. Kappos
*Director of the United States Patent and Trademark Office*